J. C. OLLARD.
FRICTION CLUTCH.
APPLICATION FILED JUNE 8, 1918. RENEWED AUG. 9, 1920.

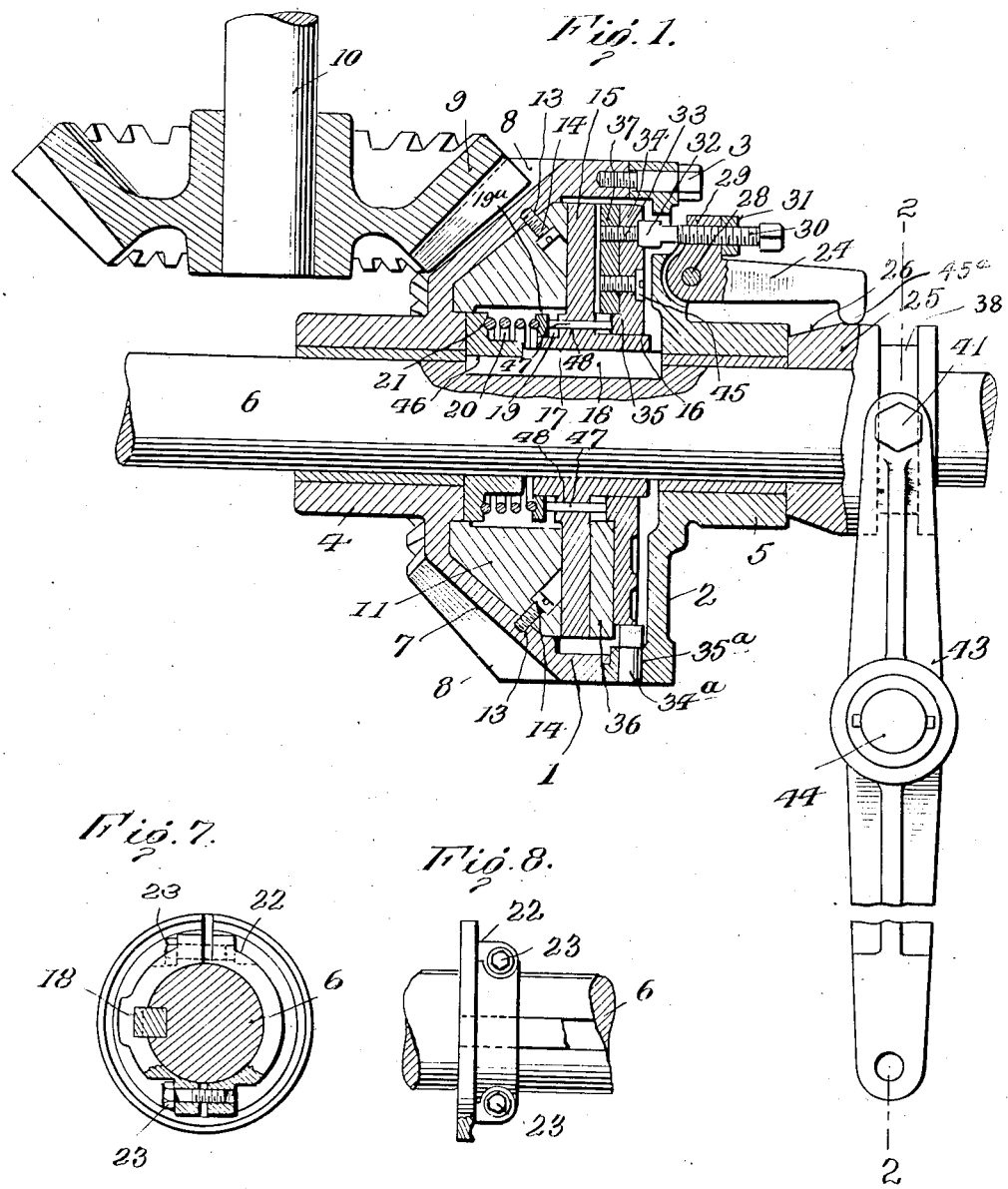

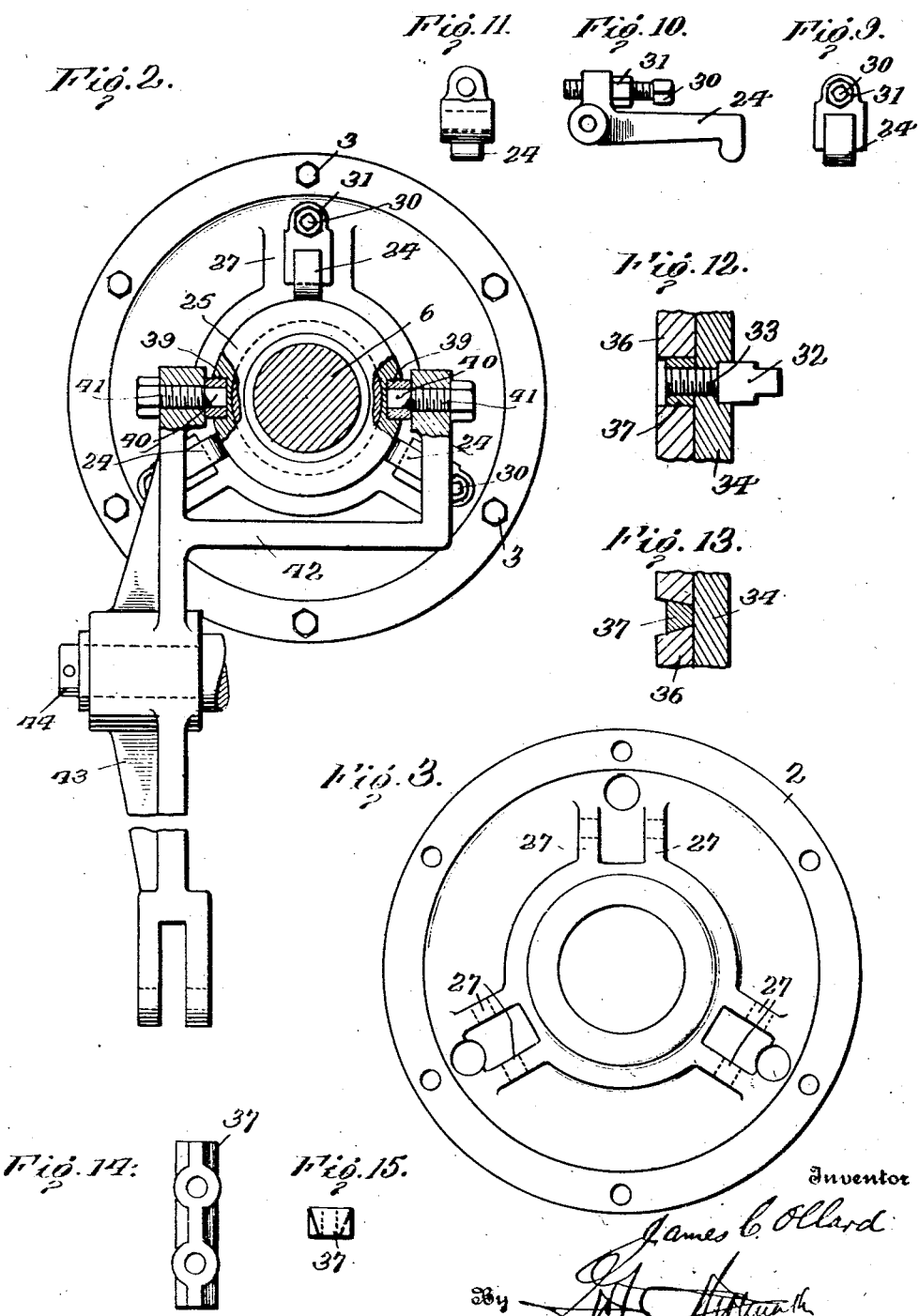

1,371,391.

Patented Mar. 15, 1921.

Inventor
James C. Ollard
By
Attorney

UNITED STATES PATENT OFFICE.

JAMES C. OLLARD, OF WILLIAMSPORT, PENNSYLVANIA.

FRICTION-CLUTCH.

1,371,391.  Specification of Letters Patent.  Patented Mar. 15, 1921.

Application filed June 8, 1918, Serial No. 238,992. Renewed August 9, 1920. Serial No. 402,300.

*To all whom it may concern:*

Be it known that I, JAMES C. OLLARD, citizen of the United States of America, residing at Williamsport, in the county of Lycoming and State of Pennsylvania, have invented certain new and useful Improvements in Friction-Clutches, of which the following is a specification.

The invention relates to improvements in clutches.

The object of the present invention is to improve the construction of clutches and to provide a simple, practical and efficient friction clutch of strong, durable and comparatively inexpensive construction designed for general work and capable of easy operation to clutch the gear carrying section to the shaft and to readily release the said section when desired.

In the drawings:

Figure 1 is a longitudinal sectional view of a friction clutch constructed in accordance with this invention;

Fig. 2 is a transverse sectional view partly in elevation taken substantially on the line 2—2 of Fig. 1.

Fig. 3 is an end elevation of one of the sections of the housing;

Figs. 7 and 8 are detail views of the sectional set collar;

Figs. 9, 10 and 11 are detail views of one of the clutch levers;

Fig. 12 is a detail sectional view illustrating the construction of the combined thrust and lining attaching screws;

Fig. 13 is a detail sectional view illustrating the manner of mounting the wood lining of the clamping plate; and Figs. 14 and 15 are detailed views of the dove tail nuts.

Like numerals of reference designate corresponding parts in the several figures of the drawings.

Figure 4:
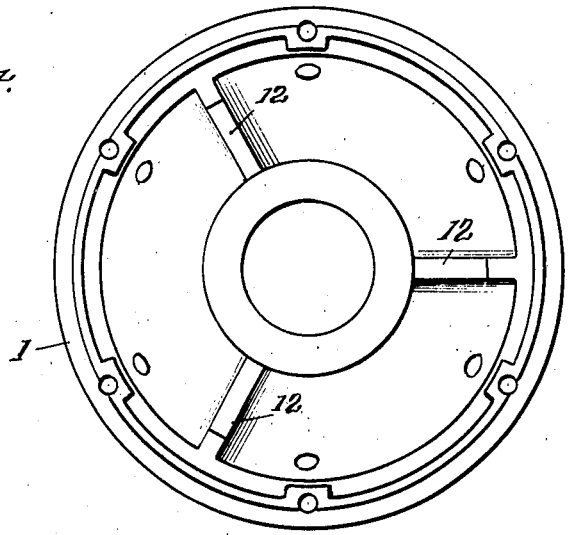
Fig. 4 is a similar view of the other section of the housing.
Figure 5:
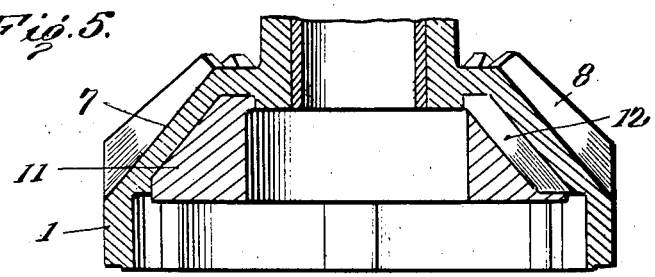
Fig. 5 is a detail sectional view of the gear carrying section of the housing.
Figure 6:
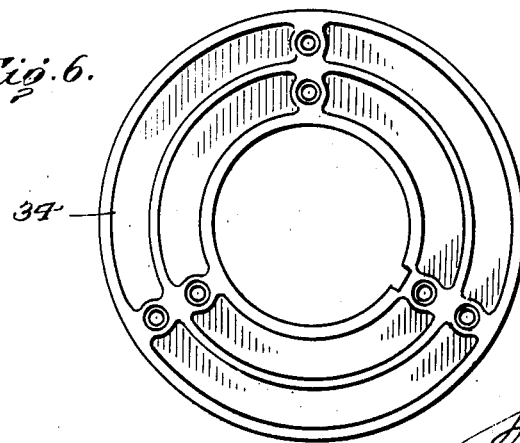
Fig. 6 is an elevation of the clamping plate.

In the accompanying drawing in which is illustrated the preferred embodiment of the invention, the friction clutch comprises in its construction a housing composed of sections or members 1 and 2 secured together at their peripheries by bolts 3 and provided at their ends with babbitted bearing portions 4 and 5 through which passes a shaft 6. The section or member 1 of the housing has a beveled face 7 provided with miter teeth 8 forming a miter or bevel gear which is adapted to mesh with a bevel pinion 9 of a shaft 10 but the form of the gear face of the clutch member or section 1 of the housing may of course be varied as will be readily understood.

The member 1 of the housing is tapered and is provided with a wood lining 11 preferably composed of sections separated by ribs 12 of the section 1 which is also provided with threaded openings 13 for the reception of screws 14 for securing the wood sections of the lining to the section or member 1 of the housing. The lining 11 provides a friction face for coöperating with one of the faces of a friction disk 15 having inner and outer hub portions 16 and 17 and slidably interlocked with the shaft 6 by a feather key 18 whereby it is held against rotary movement independently of the shaft 6. The outer hub portion 17 is provided with an annular recess 19 for the reception of a steel ring 19ª which bears against a coiled spring 20 and the latter fits in an annular groove 21 of a sectional set collar 22 mounted upon the shaft by screws 23. The set collar and the friction disk are located within the housing as clearly illustrated in Fig. 1 of the drawings.

The friction disk is actuated to carry it into engagement with the wood lining of the section 1 of the clutch casing by means of a plurality of levers 24 and a slidable sleeve 25 mounted on the shaft 6 and provided with a bevel portion 26 adapted to be carried beneath the outer ends of the clutch levers 24 for forcing the said outer ends outwardly to the position illustrated in Fig. 1 of the drawings. The clutch levers 24 are mounted between spaced lugs 27 which are pierced by pins 28 or other suitable fastening devices which constitute pivots for the clutch levers. The clutch levers are also provided with threaded openings 29 for the reception of adjusting screws 30 provided with set or jam nuts 31 and arranged to engage elongated heads 32 of combined thrust and attaching screws 33 of a clamping plate 34. The clamping plate 34 which is provided with a central opening to receive the inner hub portion 16 of the friction disk is slidably interlocked with the member 2 of the housing by suitable radial dowel keys 34ᵃ and is provided with a wood lining 36 secured to the inner face of the clamping plate by the combined thrust and attaching screws 33. The radial dowel keys 34ᵃ are mounted in openings 35ᵃ of the section 2 of the geared housing. The wood lining which frictionally engages the adjacent face of the friction disk is provided with dove tail nuts 37 which are engaged by the screws 33 and the latter are arranged to receive the adjusting screws of the clutch levers. By this construction the screws 33 receive the full thrust of the clutch levers in operating the clamping plate to force the lining thereof into engagement with the friction disk and to carry the friction disk into engagement with the wood lining of the section or member 1 of the housing. The screws are preferably constructed of hardened steel or other suitable material and the slidable sleeve 25 is provided with an annular groove 38 for the reception of steel rollers 39 or other suitable anti-friction devices carried by smooth inner portions 40 of screws 41 mounted in the opposite sides of a forked portion 42 of a clutch operating lever 43. The clutch operating lever 43 is mounted on a suitable pivot 44 and it may be connected with any suitable controlling means for enabling the lever 43 to be oscillated to carry the slidable member 25 into and out of engagement with the clutch levers 24 which are preferably provided with inwardly extending rounded terminals 45ᵃ to coöperate with the tapered or bevel portion of the slidable sleeve or member 25.

The dovetail nuts 37 are preferably arranged in pairs to accommodate the screws 33 and also attaching screws 45, but any desired number of fastening devices may of course be employed for this purpose.

The key 18 is provided with a recess 46 to receive the set collar and to form a shoulder for abutting against the same so that the set collar retains the key in its seat and the key operates to form a stop or abutment for the said collar. This construction provides a simple and effective means for enabling the set collar and the key to hold each other in proper operative position. The set collar and the key operate to hold the geared housing in true mesh by preventing longitudinal movement of the geared housing in either direction. The clamping plate 34 slides on the hub portion 16 and it has an inwardly extending annular flange 35 against which an annular series of pins 47 bears. The pins pass through openings 48 in the friction disk and surround the hub of the same. These pins 47 transmit the pressure of the coiled spring 20 to the clamping plate 34 to move the same automatically out of engagement with the friction disk when such parts are free to move.

What is claimed is:

1. A friction clutch of the class described including a geared housing, a friction disk located within the geared housing and having one of its faces engaging said housing, a clamping plate arranged within the housing at the opposite face of the friction disk to engage the latter and move the same into engagement with the housing, means located at one side of the friction disk for moving the latter out of engagement with the housing, means actuated by the said means for separating the clamping plate from the friction disk, and means located at the opposite side of the friction disk for operating the clamping plate to engage the same with the disk and engage the disk with the housing.

2. A friction clutch of the class described including a geared housing, a friction disk located within the geared housing and having one of its faces engaging said housing, a clamping plate arranged within the housing at the opposite face of the friction disk to engage the latter and move the same into engagement with the housing, yieldable means located at one side of the friction disk for moving the same out of engagement with the housing, means actuated by the said yieldable means for separating the clamping plate from the friction disk, and clutch levers located at the opposite side of the friction disk and arranged to operate the clamping plate for moving the same into engagement with the said disk and for carrying the disk into engagement with the housing.

3. A friction clutch of the class described, including a geared housing, a friction disk located within the geared housing, a spring interposed between the friction disk and the geared housing for moving the same out of engagement with each other, a clamping plate also arranged within the housing and coöperating with the friction disk to engage the latter and move the same into engagement with the geared housing, levers mounted on the geared housing for actuating the clamping plate, means for operating the levers, and means for transmitting the pressure of the spring to the clamping plate for separating the clamping plate from the disk.

4. A friction clutch of the class described, including a geared housing, a friction disk, a key for slidably interlocking the friction disk with a shaft or other rotary member, a set collar located within the geared housing and engaging the key, a spring interposed between the collar and the friction disk, a clamping plate also located within the housing and arranged to engage the friction disk for moving the same into engagement with the housing, means for actuating the clamping plate, and means for transmitting the pressure of the spring to the clamping plate.

5. A friction clutch of the class described, including a geared housing, a friction disk located within the housing, a key for slidably interlocking the friction disk with a shaft, said key being provided with a recess, an adjustable set collar fitting in the recess of the key and engaging the latter, a spring interposed between the collar and the friction disk, a clamping plate also located within the housing and arranged to coöperate with the friction disk, means mounted on the housing for actuating the clamping plate, and means for transmitting the pressure of the spring to the clamping plate.

6. A friction clutch of the class described including a housing, a friction disk located within the housing, a clamping plate also arranged within the housing and coöperating with the friction disk, a lining arranged at the inner face of the clamping plate, combined thrust and attaching screws securing the lining to the clamp plate and having projecting heads, and clutch levers carried by the housing and provided with means for engaging the said heads.

7. A friction clutch of the class described including a housing, a friction disk located within the housing, a clamping plate also arranged within the housing and coöperating with the friction disk, a lining arranged at the inner face of the clamping plate, combined thrust and attaching screws securing the lining to the clamp plate and having projecting heads, and clutch levers carried by the housing and provided with adjusting screws arranged to engage the said screws for actuating the clamping plate.

8. A friction clutch including a housing, a friction disk arranged within the housing, a clamping plate also arranged within the housing, a lining located at the inner face of the clamping plate and arranged to engage the friction disk and having dove tail nuts, screws piercing the clamping plate and engaging the dove tail nuts, and means carried by the housing and arranged to engage the said screws for operating the clamping plate.

9. A friction clutch including a sectional housing having a bevel face provided with teeth, tapered sections arranged within the housing adjacent the bevel face, a friction disk operating within the housing and arranged to engage the tapered sections, a clamping plate slidably mounted on the friction disk and having a lining for engaging the same, and means mounted on the housing exteriorly thereof and operating through openings in the same for actuating the clamping plate.

10. A friction clutch of the class described including a housing, a friction disk located within the housing, a clamping plate also arranged within the housing and coöperating with the friction disk at one face thereof, a ring slidable on the friction disk at the opposite face thereof, a spring interposed between the ring and the housing, means for transmitting the pressure of the spring from the ring to the clamping plate, and means for actuating the clamping plate for causing the same to engage the friction disk.

11. A friction clutch of the class described including a housing, a friction disk located within the housing, a clamping plate also arranged within the housing and coöperating with the friction disk at one face thereof, a ring slidable on the friction disk at the opposite face thereof, a spring interposed between the ring and the housing, and an annular series of pins piercing the friction disk and bearing against the said ring and the clamping plate for transmitting the pressure of the spring to the said clamping plate, and means for actuating the clamping plate to engage the same with the friction disk.

In testimony whereof I affix my signature.

JAMES C. OLLARD.